(12) United States Patent
Kim

(10) Patent No.: US 8,756,762 B2
(45) Date of Patent: Jun. 24, 2014

(54) TILT ANGLE SWITCHABLE HINGE ASSEMBLY FOR PORTABLE ELECTRONIC DEVICES

(75) Inventor: Jin-man Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 13/268,019

(22) Filed: Oct. 7, 2011

(65) Prior Publication Data

US 2012/0180260 A1 Jul. 19, 2012

(30) Foreign Application Priority Data

Jan. 18, 2011 (KR) .................. 10-2011-0005005

(51) Int. Cl.
*E05F 1/08* (2006.01)

(52) U.S. Cl.
USPC .................. 16/297; 16/326; 16/328; 16/335

(58) Field of Classification Search
USPC ............. 16/348, 357, 360, 231, 232, 82, 335, 16/358, 324, 297, 321, 326, 328, 331, 332, 16/349, 286, 292, 327, 359; 248/919–923; 361/679.12, 679.21, 679.26, 679.3, 361/679.55, 679.56, 679.58
See application file for complete search history.

(56) References Cited

U.S. PATENT DOCUMENTS

| | | | | |
|---|---|---|---|---|
| 917,768 A * | 4/1909 | Jordan | ............................ | 16/325 |
| 1,132,412 A * | 3/1915 | Weder et al. | .................. | 292/341 |
| 1,715,590 A * | 6/1929 | Burhenne | ..................... | 292/228 |
| 2,497,266 A * | 2/1950 | Levane | ........................... | 16/256 |
| 2,526,209 A * | 10/1950 | Durup | ............................. | 16/336 |
| 2,571,430 A * | 10/1951 | Durup | ............................. | 16/335 |
| 2,577,456 A * | 12/1951 | Doman | ........................... | 16/337 |
| 2,853,924 A * | 9/1958 | Herzfeld et al. | .............. | 351/113 |
| 3,439,377 A * | 4/1969 | Bucholz | ......................... | 16/389 |
| 3,629,900 A * | 12/1971 | Beerli, Jr. | ....................... | 16/349 |
| 3,832,756 A * | 9/1974 | Lew | .................................. | 16/297 |
| 3,874,029 A * | 4/1975 | McCullough | .................. | 16/329 |
| 4,063,330 A * | 12/1977 | Triplette | ......................... | 16/321 |
| 4,564,974 A * | 1/1986 | McGrail et al. | ................. | 16/353 |
| 4,823,438 A * | 4/1989 | Roloff | ............................. | 16/307 |
| 5,724,705 A * | 3/1998 | Hauser | ........................... | 16/388 |
| 5,815,886 A * | 10/1998 | Nishio et al. | .................... | 16/360 |
| 5,826,306 A * | 10/1998 | Faubert et al. | .................. | 16/244 |
| 6,553,623 B2 * | 4/2003 | Long | .............................. | 16/285 |
| 7,232,098 B2 * | 6/2007 | Rawlings et al. | ............. | 248/121 |
| 7,337,499 B2 * | 3/2008 | Zhang et al. | .................... | 16/357 |
| 7,520,024 B2 * | 4/2009 | Wang | .............................. | 16/321 |
| 2006/0225245 A1 * | 10/2006 | Conway et al. | ................. | 16/285 |
| 2007/0006422 A1 * | 1/2007 | Lu et al. | .......................... | 16/337 |
| 2009/0031531 A1 * | 2/2009 | Chang et al. | .................... | 16/333 |

* cited by examiner

*Primary Examiner* — Emily Morgan

(74) *Attorney, Agent, or Firm* — Drinker Biddle & Reath LLP

(57) ABSTRACT

Hinge assemblies that may adjust a tilt angle of an element of a portable electronic device in a user-comfortable position are disclosed. An example hinge assembly includes a first frame, a second frame rotatably coupled to the first frame, wherein a position of the second frame is adjustable between a first position and a second position to change a tilt angle of the second frame with respect to the first frame, a first elastic member connected to the first frame and the second frame and pressing the second frame toward the second position, and a locking member movably coupled to the first frame and capable of moving between a locking position where the locking member is engaged with the second frame to maintain the second frame at the first position, and an unlocking position where the locking member is separated from the second frame.

11 Claims, 7 Drawing Sheets

TILT ANGLE SWITCHABLE HINGE ASSEMBLY FOR PORTABLE ELECTRONIC DEVICES

CROSS-REFERENCE TO RELATED PATENT APPLICATION

This application claims the priority benefit of Korean Patent Application No. 10-2011-0005005, filed on Jan. 18, 2011, in the Korean Intellectual Property Office, the entirety of which is hereby incorporated by reference.

BACKGROUND

1. Field of the Disclosure

The present disclosure relates to a tilt angle switchable hinge assembly for portable electronic devices, and more particularly, to a hinge assembly that may adjust a tilt angle of an element of portable electronic devices so that a user may perform photography in a comfortable position.

2. Description of the Related Art

In photographing apparatuses such as camcorders, it usually takes longer to photograph a motion picture than to photograph a still image. To get a better quality motion picture, a photographer should hold a photographing apparatus in a comfortable position. However, in relation to the photography condition, a photographer sometimes needs to take an uncomfortable position, for example, twisting his/her wrist to adjust the height and angle of a photographing apparatus to correctly photograph an object.

SUMMARY

To solve the above and/or other problems, the present application discloses tilt angle switchable hinge assemblies that may adjust a tilt angle of an element of portable electronic devices so that photography may be performed in a comfortable position.

The present application discloses hinge assemblies that may adjust a tilt angle of an element of portable electronic devices in a convenient operation.

According to an aspect of the present disclosure, a hinge assembly includes a first frame, a second frame rotatably coupled to the first frame, wherein a position of the second frame is adjustable between a first position and a second position to change a tilt angle of the second frame with respect to the first frame, a first elastic member connected to the first frame and the second frame and pressing the second frame toward the second position, and a locking member movably coupled to the first frame and capable of moving between a locking position where the locking member is engaged with the second frame to maintain the second frame at the first position, and an unlocking position where the locking member is separated from the second frame.

The first frame may include a moving portion that protrudes through the second frame and the second frame may extend forming a curved line and include a slot that slidably supports the moving portion.

The moving portion may be provided in a plurality of members that are separated along a direction in which the slot extends.

The hinge assembly may further include a second elastic member that is arranged between the locking member and the first frame and elastically presses the locking member against the first frame in a direction toward the locking position.

The locking member may include a hook portion that protrudes toward the second frame to be engaged with the second frame.

The second frame may include a catch step that is to engage with the hook portion.

The hook portion may include a first inclined portion that is formed at an angle on an end portion of the hook portion facing the second frame and contacts an end portion of the second frame when the second frame is at the second position.

The second frame may include a second inclined portion that is formed on the end portion of the second frame to contact the first inclined portion.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Figure 1:
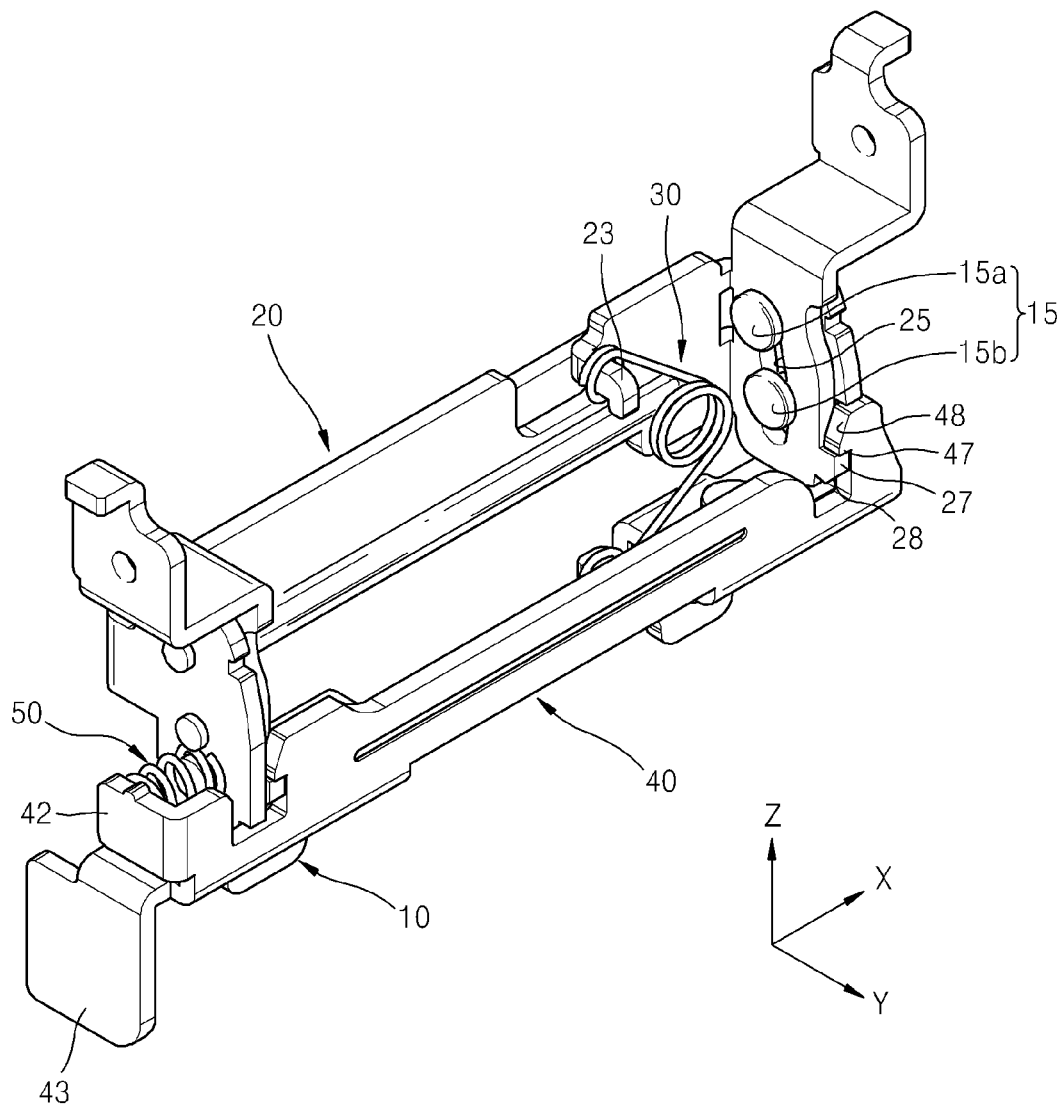
FIG. 1 is a perspective view of a tilt angle switchable hinge assembly for a portable electronic device, according to an embodiment of the present disclosure.

The attached drawings for illustrating exemplary embodiments of the present disclosure are referred to in order to gain a sufficient understanding of the present disclosure, the merits thereof, and the objectives accomplished by the implementation of the present disclosure. Hereinafter, the present disclosure will be described in detail by explaining exemplary embodiments of the disclosure with reference to the attached drawings. Like reference numerals in the drawings denote like elements.

FIG. 1 is a perspective view of a tilt angle switchable hinge assembly for a portable electronic device, according to an embodiment of the present disclosure. Referring to FIG. 1, the tilt angle switchable hinge assembly for a portable electronic device, according to the present embodiment, includes a first frame 10, a second frame 20, a first elastic member 30, and a locking member 40. The first frame 10 and the second frame 20 maintain a connected state therebetween and an angle to each other may be adjusted. The second frame 20 is rotatably coupled to the first frame 10 so that the position of the second frame 20 may be adjusted between a first position and a second position at which a tilt angle of the second frame 20 to the first frame 10 is different.

Figure 2:
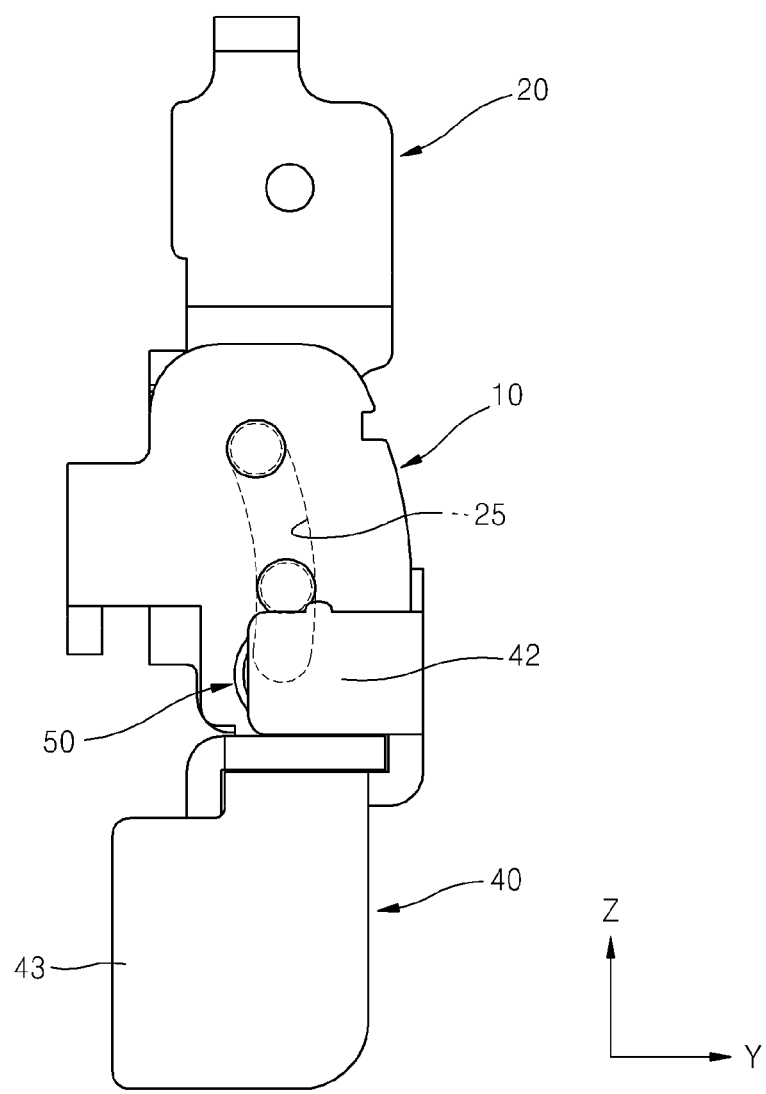
FIG. 2 is a side view of the hinge assembly of FIG. 1.
Figure 3:
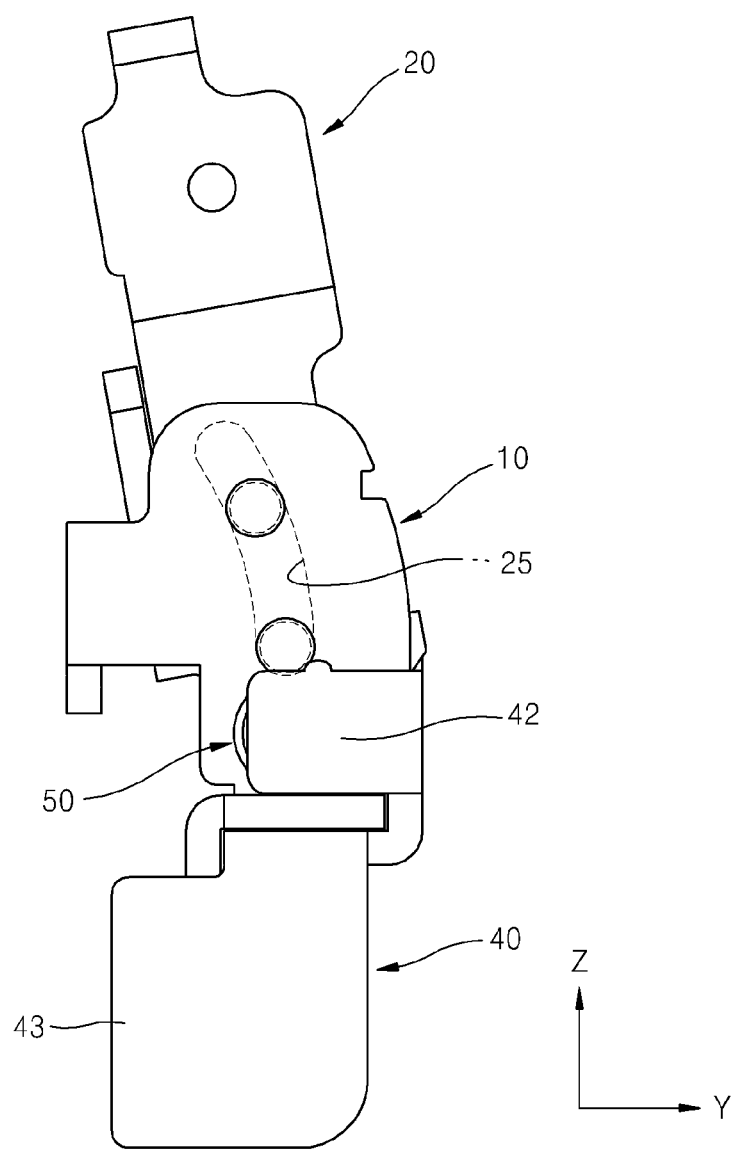
FIG. 3 is a side view illustrating the operation of the hinge assembly of FIG. 2.

FIG. 2 is a side view of the hinge assembly of FIG. 1. FIG. 3 is a side view illustrating the operation of the hinge assembly of FIG. 2. FIG. 2 illustrates an operation state at a first position where the second frame 20 and the first frame 10 are arranged to form an almost straight line. FIG. 3 illustrates an operation state at a second position where the second frame 20 and the first frame 10 are arranged forming an angle therebetween. The positions of the first frame 10 and the second frame 20 may be adjusted between the first and second positions where the angles between the first frame 10 and the second frame 20 are different from each other.

Figure 4:
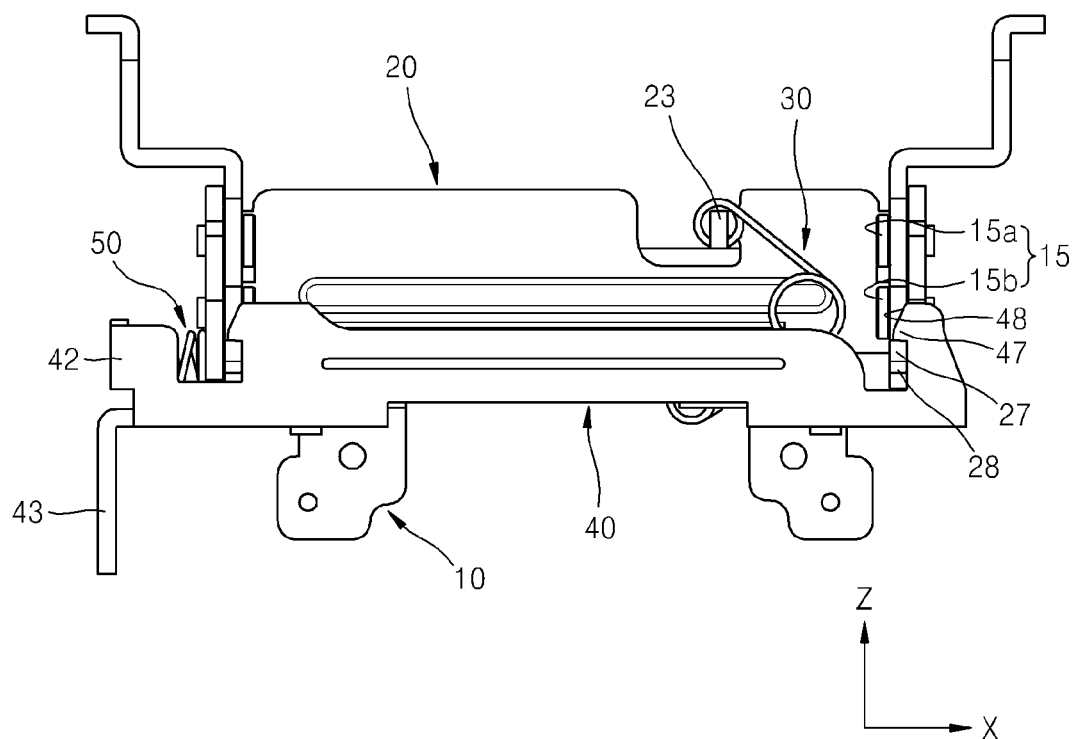
FIG. 4 is a front view of the hinge assembly of FIG. 1.

FIG. 4 is a front view of the hinge assembly of FIG. 1. Referring to FIG. 4, the first elastic member 30 is connected to each of the first frame 10 and the second frame 20. One end of the first elastic member 30 is connected to a protruding portion 23 of the second frame 20, whereas the other end thereof is connected to the first frame 10. The first elastic member 30 presses the second frame 20 against the first frame 10 toward the second position. As such, due to the operation of the first elastic member 30, a force pressing the second frame 20 toward the second position is generated.

Although in the present embodiment a compression torsion spring is used as the first elastic member 30, the present disclosure is not limited thereto and any mechanical element capable of elastically supporting the first frame 10 and the second frame 20, for example, rubber, a hydraulic spring, or a leaf spring, may be used therefor.

The locking member 40 is movably coupled to the first frame 10 and functions to maintain the second frame 20 at the first position by being coupled to the second frame 20 or to allow the second frame 20 to move to the second position by being separated from the second frame 20. Referring to FIGS. 1 and 4, the locking member 40 is coupled to the first frame 10 to be movable in a direction along an X axis.

Referring to FIG. 1, the locking member 40 is at a locking position where the locking member 40 is engaged with the second frame 20 to maintain the second frame 20 at the first position. The locking member 40 may be moved to an unlocking position where the locking member 40 is separated from the second frame 20.

A second elastic member 50 is arranged between a spring support portion 42 of the locking member 40 and the first frame 10. The second elastic member 50 functions to elastically press the locking member 40 in a direction toward the locking position. Although in the present embodiment a compression coil spring is used as the second elastic member 50, the present disclosure is not limited thereto and any mechanical element capable of providing an elastic force, for example, rubber, a hydraulic spring, or a leaf spring, may be used therefor.

The locking member 40 includes a lever 43 that protrudes outwardly. The lever 43 is a portion that receives a pressing force by a user of a portable electronic device. When the user presses a power button of the portable electronic device that will be described below, the pressing force of the user is delivered to the lever 43 contacting the power button so that the locking member 40 may be moved to the unlocking position overcoming the elastic pressing force of the second elastic member 50.

The locking member 40 includes a hook portion 47 that protrudes toward the second frame 20 to be engaged with the second frame 20. The second frame 20 includes a catch step 27 that is engaged with the hook portion 47. When the locking member 40 is at the locking position as illustrated in FIG. 1, a state in which the hook portion 47 of the locking member 40 is engaged with the catch step 27 of the second frame 20 is maintained.

The hook portion 47 includes a first inclined portion 48 that is formed at an angle on an end portion 49 facing the second frame 20 and contacts an end portion 29 of the catch step 27 of the second frame 20 when the second frame 20 is at the second position. A second inclined portion 28 corresponding to the first inclined portion 48 is installed at the end portion 29 of the catch step 27 of the second frame 20.

Figure 5:
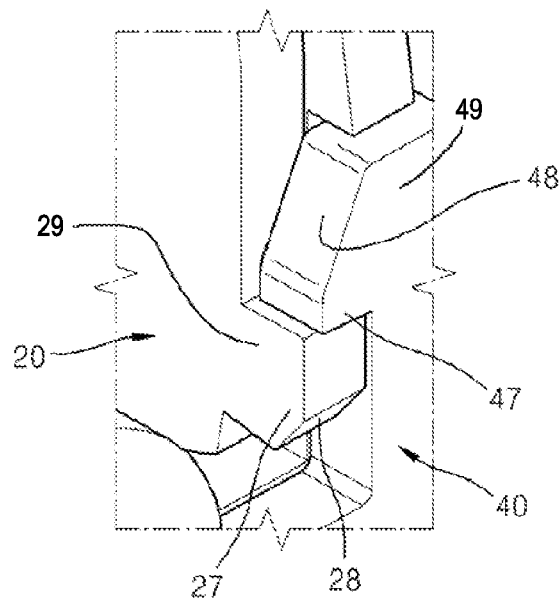
FIG. 5 is a partially enlarged perspective view of a portion of the hinge assembly of FIG. 1.
Figure 6:
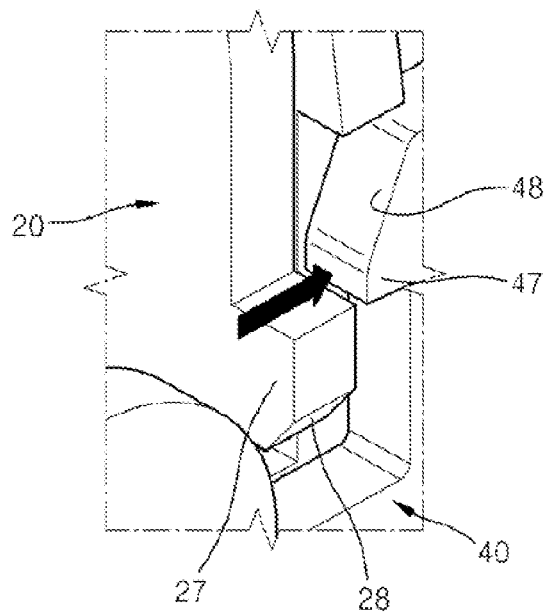
FIG. 6 is a perspective view illustrating the operation of the hinge assembly of FIG. 5.

FIG. 5 is a partially enlarged perspective view of a portion of the hinge assembly of FIG. 1. FIG. 6 is a perspective view illustrating the operation of the hinge assembly of FIG. 5. Referring to FIG. 5, the locking member 40 is at the locking position where the locking member 40 is engaged with the second frame 20. Referring to FIG. 6, the locking member 40 is at the unlocking position where the locking member 40 is separated from the second frame 20.

When the locking member 40 is separated from the second frame 20, the second frame 20 is rotated with respect to the first frame 10 and moved to the second position. When the second frame 20 is at the second position, the second inclined portion 28 of the second frame 20 faces the first inclined portion 48 (see FIG. 8).

Thus, when an external pressing force is applied to the second frame 20 at the second position, the second inclined portion 28 of the second frame 20 presses the first inclined portion 48 so that the locking member 40 may be moved toward the unlocking position. When the locking member 40 is moved to the unlocking position and simultaneously the catch step 27 of the second frame 20 is inserted under the hook portion 47 of the locking member 40, the locking member 40 is moved back to the locking position and thus the hook portion 47 is engaged with the catch step 27.

Figure 7:
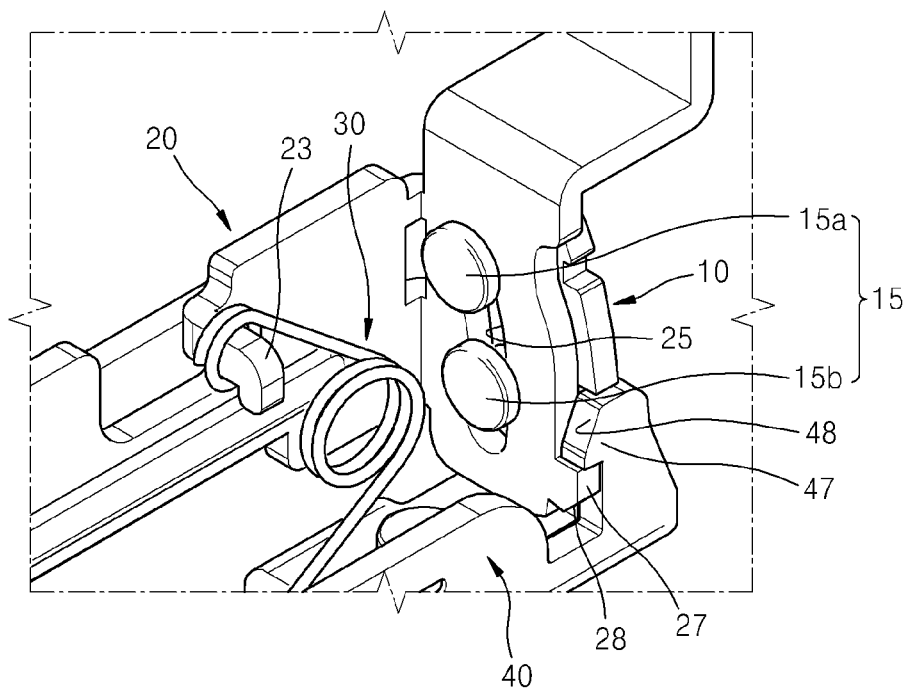
FIG. 7 is a partially enlarged perspective view of a portion of the hinge assembly of FIG. 1.
Figure 8:
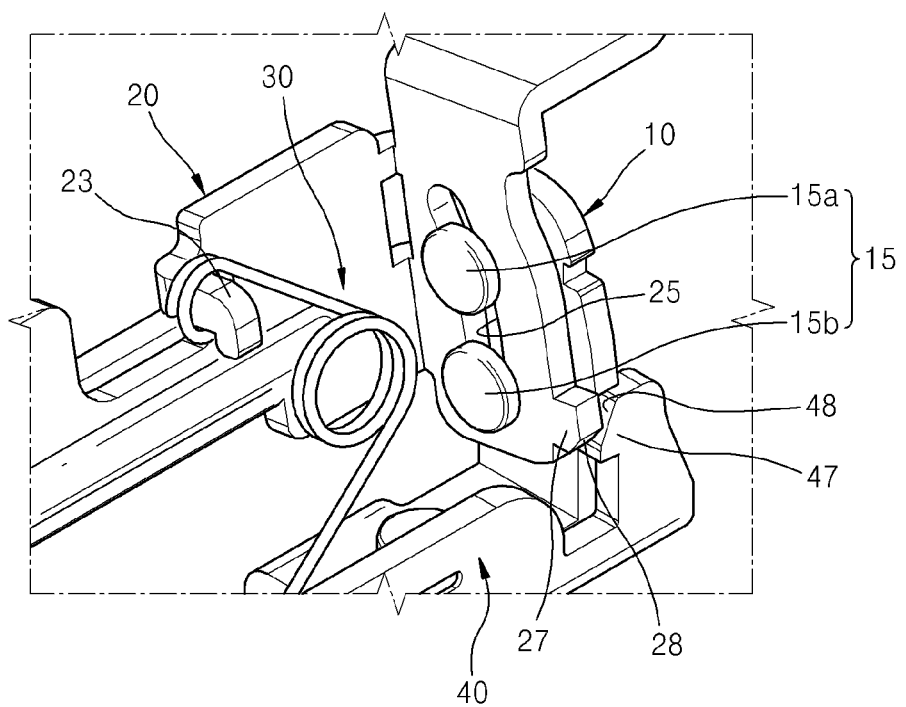
FIG. 8 is a perspective view illustrating the operation of the hinge assembly of FIG. 7.

FIG. 7 is a partially enlarged perspective view of a portion of the hinge assembly of FIG. 1. FIG. 8 is a perspective view illustrating the operation of the hinge assembly of FIG. 7. The first frame 10 includes a moving portion 15 protruding through the second frame 20. The second frame 20 includes a slot 25 supporting the moving portion 15 to be capable of sliding therein. The moving portion 15 includes a first slider 15a and a second slider 15b that are separated from each other along a direction in which the slot 25 extends. The present disclosure is not limited to the structure of the moving portion 15 and, thus, the number of sliders forming the moving portion 15 may be increased or only one slider may be installed.

Because the slot 25 extends forming a curved line, the second frame 20 may rotate with respect to the first frame 10 as the moving portion 15 slides along the slot 25. A relative rotation angle of the second frame 20 with respect to the first frame 10 may be adjusted by selecting the shape of the slot 25.

Figure 9:
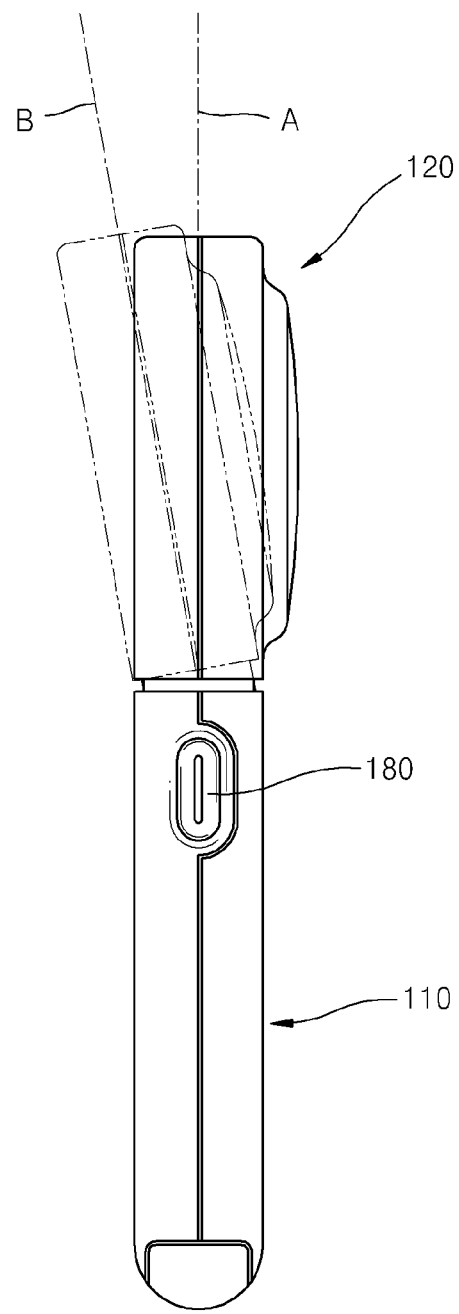
FIG. 9 is a side view illustrating the operation of a portable electronic device having the hinge assembly of FIG. 1.

FIG. 9 is a side view illustrating the operation of a portable electronic device having the hinge assembly of FIG. 1. In FIG. 9, a digital camcorder is provided as an example of the portable electronic device. A lens of a camera, for example, may be installed in a rotating portion 120 of the digital camcorder of FIG. 9. A power button 180 is installed at a side surface of an operation portion 110 that rotatably supports the rotating portion 120. The rotating portion 120 and the operation portion 110 are connected by the hinge assembly that is described with reference to FIGS. 1-8.

For example, the operation portion 110 is connected to the first frame 10, whereas the rotating portion 120 is connected to the second frame 20. The power button 180 is electrically connected to a power source portion (not shown) for supplying electric power to elements of the digital camcorder. Accordingly, when a user presses the power button 180, the power source portion may start to supply electric power or cut the power supply off.

Because the lever 43 of the locking member 40 of FIG. 1 is mechanically connected to the power button 180, when the user presses the power button 180, a pressing force is delivered to the lever 43 so that the hinge assembly may be operated. Thus, when the user presses the power button 180 of the digital camcorder, power supply begins and simultaneously the rotating portion 120 located at the first position that substantially corresponds to a line A of FIG. 9 rotates with respect to the operation portion 110 so that the rotating portion 120 is moved to the second position that substantially corresponds to a line B. The user may manually rotate the rotating portion 120 with respect to the operation portion 110 in order to move the rotating portion 120 back to the first position.

Because a tilt angle of each element of the portable electronic device may be automatically adjusted by using the above-described hinge assembly, the user may photograph in a comfortable position. Also, by mechanically connecting the power button 180 and the locking member 40, the tilt angle of an element of the portable electronic device may be easily changed by simply pressing the power button 180.

As described above, in the hinge assembly for a portable electronic device, according to the present disclosure, because the second frame can be moved between the first position and the second position to change a tilt angle of the second frame with respect to the first frame, the tilt angle of an element of a portable electronic device may be adjusted so that photography may be performed in a comfortable position. Also, because the position of the second frame is automatically adjusted by a simple operation to press the locking member, the tilt angle of the element of the portable electronic device may be conveniently changed.

The apparatus described herein may comprise a processor, a memory for storing program data to be executed by the processor, a permanent storage such as a disk drive, a communications port for handling communications with external devices, and user interface devices including a display, keys, etc. When software modules are involved, these software modules may be stored as program instructions or computer-readable code executable by the processor on a tangible or non-transitory computer-readable media such as read-only memory (ROM), random-access memory (RAM), CD-ROMs, magnetic tapes, floppy disks, and optical data storage devices. The computer-readable recording media may also be distributed over network-coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art.

The embodiments disclosed herein may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of this disclosure and are not intended to otherwise limit the scope of this disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosed embodiments unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the disclosed embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the disclosed embodiments and does not pose a limitation on the scope of the claimed inventions unless specifically recited. Numerous modifications and adaptations will be readily apparent to those of ordinary skill in this art without departing from the spirit and scope of this disclosure.

While this disclosure has been particularly shown and described with reference to exemplary embodiments thereof, it will be understood by those skilled in the art that various changes in form and details may be made therein without departing from the spirit and scope of this disclosure as defined by the appended claims.

What is claimed is:

1. A hinge assembly comprising:
a first frame, having an elongated portion, first and second ends perpendicular to the elongated portion, at least one first pin protruding from the first end, and at least one second pin protruding from the second end;
a second frame, having an elongated portion, first and second ends perpendicular to the elongated portion with respective first and second curved slots, wherein the at least one first pin protrudes through the first curved slot and the at least one second pin protrudes through the second curved slot;

wherein the second frame is rotatably coupled to the first frame by the at least one first pin, the at least one second pin, and the first and second curved slots, wherein the second frame is slidably adjustable between a first rotation position and a second rotation position to change a tilt angle of the second frame with respect to the first frame;

the hinge assembly further comprising:

a first elastic member connected between the first frame and the second frame that presses the second frame toward the second rotation position; and an elongated locking member, movably coupled to the first frame to slide along the elongated portions of the first and second frames between a locking position, where the elongated locking member is engaged with the second frame to maintain the second frame at the first position, and an unlocking position, where the elongated locking member is separated from the second frame;

wherein:

the first end of the second frame comprises a catch step;

a first end of the elongated locking member comprises a hook portion that protrudes toward the second frame, wherein the hook portion engages the catch step when the second frame is in the first position and the elongated locking member is in the locking position;

the hook portion comprises a first inclined portion;

the catch step comprises a second inclined portion that engages the first inclined portion when the second frame is moved from the second position to the first position to slide the elongated locking member in a direction toward the unlocking position.

2. The hinge assembly of claim 1, wherein the at least one first pin and the at least one second pin slide along the first and second curved slots, respectively, when the second frame rotates between the first and second positions.

3. The hinge assembly of claim 2, wherein the at least one first pin comprises a first plurality of pins;

wherein the at least one second pin comprises a second plurality of pins.

4. The hinge assembly of claim 1, further comprising a second elastic member that is arranged between the elongated locking member and the first frame and elastically presses the elongated locking member against the first frame toward the locking position.

5. The hinge assembly of claim 1, wherein the first inclined portion is formed at an angle on an end portion of the hook portion facing the second frame;

wherein the first inclined portion engages the second inclined portion when the second frame is at the second position.

6. The hinge assembly of claim 5, wherein the second inclined portion is formed on an end portion of the catch step to engage the first inclined portion.

7. A portable electronic device, comprising:

an operation portion, a rotating portion, a hinge assembly, and a power button; wherein:

the operation portion is rotatably connected to the rotating portion by the hinge assembly;

the hinge assembly comprises a first frame, a second frame, a first elastic member, and an elongated locking member;

the first frame having an elongated portion, first and second ends perpendicular to the elongated portion, at least one first pin protruding from the first end, and at least one second pin protruding from the second end;

the second frame having an elongated portion, first and second ends perpendicular to the elongated portion with respective first and second curved slots, wherein the at least one first pin protrudes through the first curved slot and the at least one second pin protrudes through the second curved slot;

the second frame is rotatably coupled to the first frame by the at least one first pin, the at least one second pin, and the first and second curved slots, wherein the second frame is slidably adjustable between a first rotation position and a second rotation position to change a tilt angle of the second frame with respect to the first frame;

the first elastic member is connected between the first frame and the second frame and presses the second frame toward the second rotation position; and the elongated locking member is movably coupled to the first frame to slide along the elongated portions of the first and second frames between a locking position, where the elongated locking member is engaged with the second frame to maintain the second frame at the first position, and an unlocking position, where the elongated locking member is separated from the second frame;

the first end of the second frame comprises a catch step;

a first end of the elongated locking member comprises a hook portion that protrudes toward the second frame, wherein the hook portion engages the catch step when the second frame is in the first position and the elongated locking member is in the locking position;

the hook portion comprises a first inclined portion;

the catch step comprises a second inclined portion that engages the first inclined portion when the second frame is moved from the second position to the first position to slide the elongated locking member in a direction toward the unlocking position;

the power button is mechanically connected to the elongated locking member to transfer a button pressing force against the power button to the elongated locking member; and the elongated locking member slides from the locking position to the unlocking position when the power button receives the button pressing force.

8. The portable electronic device of claim 7, wherein:

the operation portion is connected to the first frame; and the rotating portion is connected to the second frame.

9. The portable electronic device of claim 8, wherein the hinge assembly automatically adjusts the tilt angle of the second frame with respect to the first frame when the power button receives the button pressing force.

10. The portable electronic device of claim 9, wherein the power button starts a supply of electric power for the portable electronic device and simultaneously rotates the rotating portion from a first rotation position of the rotating portion to a second position of the rotating portion when the power button receives the button pressing force.

11. The portable electronic device of claim 9, wherein:

the rotating portion is configured to receive the external pressing force to rotate the rotating portion relative to the operation portion.

* * * * *